United States Patent [19]
Chen et al.

[11] Patent Number: 5,801,799
[45] Date of Patent: Sep. 1, 1998

[54] MULTI-DIRECTIONAL LIQUID CRYSTAL PHASE SPATIAL LIGHT MODULATOR FOR ENCHANCED DISPLAY RESOLUTION

[75] Inventors: Diana Chen, Gilbert; Phil Wright, Scottsdale; Rong-Ting Huang, Gilbert, all of Ariz.

[73] Assignee: Motorola, Inc., Schaumburg, Ill.

[21] Appl. No.: 773,539

[22] Filed: Dec. 23, 1996

[51] Int. Cl.$^6$ .............................. G02F 1/1347; G02F 1/13
[52] U.S. Cl. ................................................. 349/74; 349/202
[58] Field of Search ............................ 349/74, 77, 202

[56] References Cited

U.S. PATENT DOCUMENTS 5,126,869  6/1992  Lipchak et al. ..................... 349/74
5,307,073  4/1994  Riza ................................... 359/578
5,537,256  7/1996  Fergason ........................... 359/495

Primary Examiner—Anita Pellman Gross
Attorney, Agent, or Firm—Eugene A. Parsons

[57] ABSTRACT

A phase spatial light modulator composed of a liquid crystal memory cell and a liquid crystal polarization switch. The liquid crystal memory cell having phase information recorded during the fabrication process thereby affecting the liquid crystal material contained within the cell. The liquid crystal polarization switch capable of perpendicularly rotating the polarization of light impinging upon the liquid crystal polarization switch, prior to passage through the liquid crystal memory cell in response to an applied voltage. The modulator, or scanner, thereby capable of modulating the phase of light passing therethrough, resulting in a high resolution resultant integrated image

23 Claims, 3 Drawing Sheets

40

50

50

50

MULTI-DIRECTIONAL LIQUID CRYSTAL PHASE SPATIAL LIGHT MODULATOR FOR ENCHANCED DISPLAY RESOLUTION

FIELD OF THE INVENTION

The present invention pertains to the field of optical scanners, or beam steerers and the method of fabrication of such devices, and more particularly to the modulation of light resulting in the enhanced display resolution of a visual image.

BACKGROUND OF THE INVENTION

The human visual system is a complex system with a great ability to absorb vast amounts of information originating in many varying formats, including visual displays. Visual displays are found in varying sizes and forms in today's world, displaying many types of information, from large visual display screens announcing scheduling information found in airports, to small visual displays, such as those incorporated into pocket calculators. Of concern in the reduction in the size of visual displays, specifically those utilized in portable electronic devices, such as portable communications equipment, or the like, is the display resolution quality and the maintenance of minimal power requirements, simple drive circuitry and low manufacturing costs.

One alternative method of fabricating a miniature visual display is to utilize scanning techniques to create an integrated image generated from an image source having a minimal number of pixels. Of relevance in the reduction in size of visual displays utilizing scanning techniques, and the maintenance of resolution quality, is the human visual system's ability to process and integrate information, and the speed at which the visual system is able to do so. The human visual system can process information no faster than approximately 60 Hz. Therefore, an image that is projected and scanned within 1/60th of a second to varying positions within a visual display is seen by the eyes of the viewer as one enlarged integrated image. As an example, by moving an image of an "A" to six different locations within a visual display, at a frequency of 60 Hz, the viewer will see one integrated image composed of six "A"s. If the image is simultaneously content modulated, for example, the images of six letters "A", "B", "C", "D", "E" and "F" that are individually and sequentially moved to six varying positions at a speed of 60 Hz., the viewer will see one integrated image composed of the six letters. This process, more commonly known as time-multiplexed imagery, can be utilized in the field of display technology through the use of scanners or beam steerers, and more specifically in the development of enhanced resolution miniature visual displays.

Scanning, or beam steering, devices utilized today aid in increasing the resolution of visual displays. These scanning devices can be found in many forms, most commonly electro-mechanical scanners incorporating mirrors, such as galvanometric scanners and polygonal scanners. These types of electro-mechanical scanners are commonly quite large in size, therefore not amenable to the incorporation into a display device that is small, lightweight, operates with low power consumption and is meant to be portable in nature. In addition, mechanical scanners are complex and thus expensive to manufacture and in many instances utilize great amounts of power during operation.

Recent invention has brought about new scanning devices that are capable of being fabricated small enough in size and power requirements so as to be incorporated into portable products, such as pixellated miniature liquid crystal phase spatial light modulators. This type of scanning device generally requires the use of a large number of interconnects to drive the device and achieve the desired number of phase changes. For instance, during operation varying voltages are required to be exerted upon specific areas of a liquid crystal cell dependent upon the phase shift required for that particular area of the cell. The result is a very complex drive circuitry where the required scanning angle is large or the scanning aperture is large. In addition, because of the large number of interconnects, manufacturing costs are increased.

Recent invention has also brought about non-pixellated scanning devices which record alignment information within at least one liquid crystal memory cell. More particularly a blazed phase grating is stored in a plurality of nematic liquid crystal memory cells which is turned "ON" and "OFF" by applying a voltage. This application of a voltage provides for a change in polarization, thus two-directional beam deflection of the light passing therethrough. While this system adequately provides for desired beam deflection, the polarization switching speed is relatively slow due to the required time it takes for the nematic liquid crystal molecules within the liquid crystal cells to relax to their original position.

Thus, there is a need for a small non-pixellated liquid crystal phase spatial light modulator scanning device capable of operation that allows for the switching of the polarization of light prior to passage through a liquid crystal memory cell, the light thus being steered, or scanned, in response to phase information recorded in the liquid crystal memory cell during fabrication.

Accordingly, it is highly desirable to provide for a scanning device, that utilizes a liquid crystal phase spatial light modulator for phase modulation composed of a liquid crystal memory cell and a liquid crystal polarization switch, in which phase gratings can be recorded in the scanning device, more particularly the liquid crystal memory cell, during fabrication, thereby providing for the scanning of light passing therethrough in response to input signals exerted upon the liquid crystal polarization switch.

It is a purpose of the present invention to provide a new and improved liquid crystal phase spatial light modulator for display resolution enhancement that is capable of spatially modulating light passing therethrough.

It is a still further purpose of the present invention to provide for a scanning device that is capable of directionally deflecting a beam of light dependent upon the polarization of the light passing therethrough in response to information recorded in a liquid crystal memory cell.

It is yet another purpose of the present invention to provide for a scanning device that is capable of fast two-directional beam deflection utilizing a liquid crystal polarization switch and a liquid crystal memory cell.

It is a further purpose of the present invention to provide a liquid crystal phase spatial light modulator, or scanner, incorporated into a new and improved visual display system for display resolution enhancement, thereby allowing for the incorporation of the scanner into miniature visual displays.

SUMMARY OF THE INVENTION

The above problems and others are substantially solved and the above purposes and others are realized in a liquid crystal phase spatial light modulator generally comprised of at least one liquid crystal memory cell having phase information recorded in a plurality of liquid crystal molecules contained therein and a liquid crystal polarization switch capable of perpendicularly rotating the polarization of light passing therethrough in response to an external stimulus. The liquid crystal memory cell is optically positioned so as to allow light passing through the liquid crystal polarization switch, having undergone a change in polarization, to pass therethrough the liquid crystal memory cell and undergo optical deflection according to the recorded phase information. More particularly the liquid crystal phase spatial light modulator allows for one of a straight passage and an optical deflection, of a light beam passing therethrough dependent upon the polarization of the light passing therethrough and the external stimulus applied thereto.

In general, the multi-directional liquid crystal phase spatial light modulator of the present invention, hereinafter referred to as a liquid crystal scanner, serves to spatially modulate the phase of the light emitted by the image source, thus the directional path of the light passing therethrough.

BRIEF DESCRIPTION OF THE DRAWINGS

The novel features believed characteristic of the invention are set forth in the claims. The invention itself, however, as well as other features and advantages thereof will be best understood by reference to detailed descriptions which follow, when read in conjunction with the accompanying drawings, wherein:

DETAILED DESCRIPTION OF THE PREFERRED EMBODIMENT

Figure 1:
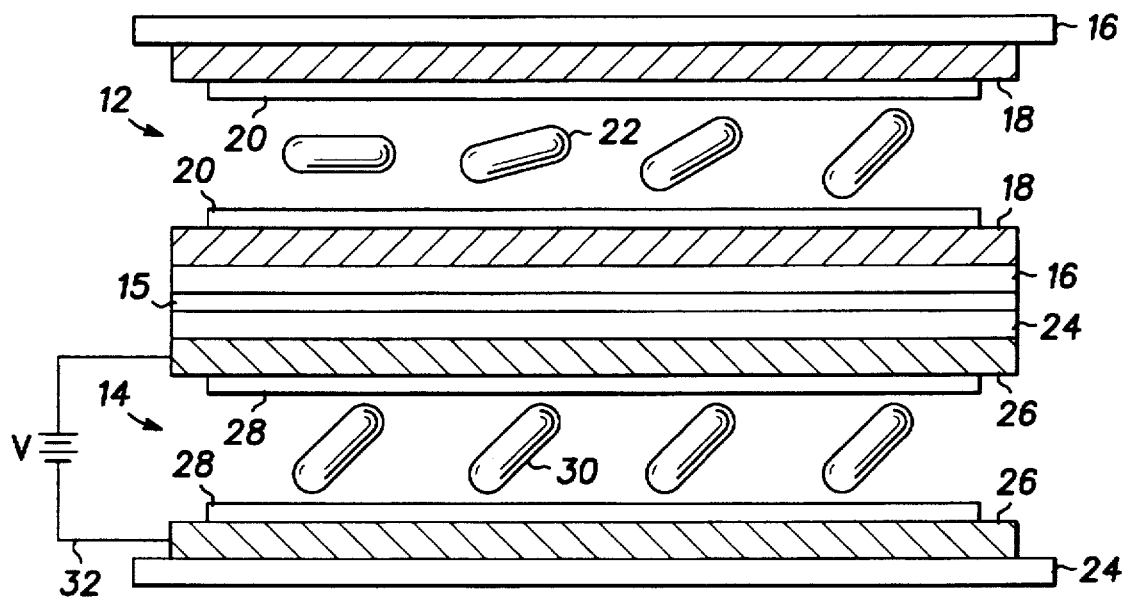
FIG. 1 is simplified cross-sectional view of the structure of a liquid crystal phase spatial light modulator according to the present invention.

The present invention is based on utilizing individually addressable visible light emitting devices formed in an array, that in combination with driver/control circuitry and optical elements compose a light emitting display device, or image source, of the present invention. To increase the resolution for a given number of light emitting devices or to reduce the number of light emitting devices needed to achieve a desired resolution, scanning techniques utilizing a liquid crystal phase spatial light modulator, hereinafter also referred to as a liquid crystal scanner, are employed. The light emitting display device serves as the image source for a visual display system whereby a resulting integrated image is formed by scanning portions or elements of the array of light emitting devices, through the liquid crystal scanner, thereby spatially modulating the phase of the light emitted by that portion. This phase modulation serves to change the directional travel and in essence "moves" the light to another portion of the display. More particularly, the scanner allows for a straight passage or an optical deflection of the light beam passing therethrough dependent upon the external stimulus applied thereto a liquid crystal polarization switch and phase information recorded in at least one liquid crystal memory cell. This scanning action forms what appears to the observer to be a high resolution resultant integrated image. Those skilled in the art will appreciate that scanning allows a full page display to be created from a much smaller number of display devices than is necessary to generate the full page display. The resultant integrated image is viewable as one of a direct view image, a miniature virtual image, or a projected image.

The scanning process utilized in the present invention is based on the principle of spatial phase modulation, thereby altering the directional path of light emitted by portions or elements of the array of light emitting devices. Of concern in the fabrication of a resultant integrated image utilizing prior art scanning techniques, is the number of interconnects and complexity of the drive circuitry, thus the manufacturing costs.

In a preferred embodiment of the device of the present invention, the liquid crystal phase spatial light modulator is composed of at least one liquid crystal memory cell, having no defined pixels and containing recorded molecular orientation, and a liquid crystal polarization switch. It should be understood that any number of liquid crystal cells can be linearly aligned to form the scanner of the present invention. Linearly polarized light entering the liquid crystal scanner device undergoes a change in polarization in response to an external stimulus applied to the liquid crystal polarization switch and subsequently a phase modulation as it passes through the liquid crystal memory cell dependent upon the recorded phase information contained in the liquid crystal memory cell, i.e. the recorded molecular orientation.

Referring now to the accompanying illustrations, disclosed is the multi-directional liquid crystal modulator, or scanner, device of the present invention, fabricated according to various disclosed methods. It should be understood that the preferred embodiment of the liquid crystal scanner of the present invention is generally composed of a plurality of liquid crystal cells linearly aligned end to end.

The specific methods of fabrication which may be utilized in the formation of the scanner of the present invention as well as the structure itself, are described with regard to FIG. 1, illustrating in simplified partial cross-sectional view the scanner structure according to the disclosed methods of fabrication. Referring now to FIG. 1, illustrated in schematic sectional view is the structure of a multi-directional liquid crystal phase spatial light modulator 10 according to the present invention. Modulator 10 is generally composed of a liquid crystal memory cell 12 and a liquid crystal polarization switch 14. Liquid crystal memory cell 12 is generally formed according to methods disclosed in U.S. patent application entitled "BI-STABLE NON-PIXELLATED PHASE SPATIAL LIGHT MODULATOR FOR ENHANCED DISPLAY RESOLUTION AND METHOD OF FABRICATION", Attorney Docket No. CR 96-078, mailed Oct. 1, 1996, assigned to the same assignee and incorporated herein by this reference. More particularly, liquid crystal memory cell 12 is fabricated utilizing one of a mechanically-induced fabrication of an alignment layer employing evaporative techniques to achieve altered liquid crystal molecular alignment, a chemically-induced fabrication method employing evaporative techniques that utilize various alignment materials, a photo-chemical reaction to achieve optical storage of information in a doped liquid crystal, or laser writing techniques to store phase information within memory cell 12.

Referring specifically to FIG. 1, a simplified and enlarged partial sectional view of multi-directional liquid crystal phase spatial light modulator 10 generally fabricated in a stack formation including liquid crystal memory cell 12 and liquid crystal polarization switch 14, optically aligned utilizing an optically transparent adhesive 15, or the like. Alternatively, fabrication of modulator 10 is achieved whereby liquid crystal memory cell 12 and liquid crystal polarization switch 14 share a common intermediate substrate element, therefore inherently achieving optical alignment.

In the disclosed preferred embodiment, liquid crystal memory cell 12 is composed of two substrates 16 formed of any convenient optically transparent material, such as glass. A conductive material layer 18 is optionally formed on an upper surface of each substrate 16, dependent upon the method of fabrication of memory cell 12. In this particular embodiment, memory cell 12 is fabricated utilizing a photochemical reaction of a doped liquid crystal and therefore includes conductive material layer 18. Alternatively, when liquid crystal memory cell 12 is fabricated utilizing one of a mechanically-induced change and a chemically-induced change, there is no requirement for a layer of conductive material within liquid crystal memory cell 12. In this embodiment, electrically conductive material layer 18 is fabricated of an optically transparent material, such as indium tin oxide (ITO), thereby allowing the light impinging thereupon to pass therethrough and defining optically clear contacts. A molecular liquid crystal alignment, or orientation, layer 20 is positioned on a surface of each of the transparent electrically conductive material layers 18. Alignment layers 20 serve to properly position and align a plurality of molecules 22 comprising the liquid crystal material (discussed presently), so as to orient the molecules in a specific direction according to recorded phase information. Liquid crystal memory cell 12 is fabricated having a phase function with a large retardation stored in the liquid crystal material, more particularly including the phase function of a prism. It should be understood that while two separate alignment layers 20 are disclosed in this liquid crystal memory cell fabrication, alternative fabrication utilizing only one single alignment layer is anticipated by this disclosure.

During fabrication of liquid crystal memory cell 12, steps are completed so as to record varying phase modulation information through a chemically-induced or mechanically-induced molecular alignment technique. Once this step in the fabrication process is complete the two substrate components are aligned, filled with a continuous layer of nematic liquid crystal material composed of the plurality of liquid crystal molecules 22 thereby forming the liquid crystal memory cell 12 component of the multi-directional liquid crystal phase spatial light modulator, or scanner, 10. Once filled, the recorded information in the alignment layer 20 serves to align the liquid crystal molecules 22 contained within the memory cell 12. It should be understood that during fabrication of memory cell 12 utilizing a photochemical reaction of a doped liquid crystal, that a drive circuitry (not shown) is interfaced with conductive material layer 18 thereby capable of biasing memory cell 12 and recording information in molecular alignment layer 20.

A second component, the liquid crystal polarization switch 14 is fabricated generally in stack formation. More particularly, in the preferred embodiment liquid crystal polarization switch 14 is composed of two substrates 24 formed of any convenient optically transparent material, such as glass. A conductive material layer 26 is formed on an upper surface of each substrate 24. Electrically conductive material layer 26 is fabricated of an optically transparent material, such as indium tin oxide (ITO), thereby allowing the light impinging thereon to pass therethrough and defining optically clear contacts. A molecular liquid crystal alignment, or orientation, layer 28 is positioned on a surface of each of the transparent electrically conductive material layers 26. Alignment layers 28 serve to properly position and align a plurality of molecules 30 comprising the liquid crystal material (discussed presently), so as to orient the molecules in a specific direction according to an external stimulus exerted thereupon. It should be understood that while two separate alignment layers 28 are disclosed in this liquid crystal polarization switch fabrication, alternative fabrication utilizing only one single alignment layer is anticipated by this disclosure. Once this step in the fabrication process is complete the two substrate components are aligned, filled with a continuous layer of ferroelectric liquid crystal material composed of the plurality of liquid crystal molecules 30 thereby forming the liquid crystal polarization switch 14 component of the multi-directional liquid crystal phase spatial light modulator, or scanner, 10. It should be understood that while specific types of liquid crystal material have been disclosed in the fabrication of liquid crystal memory cell 12 and liquid crystal polarization switch 14, other types of liquid crystal materials, as well as scanners utilizing other phase modulating materials are anticipated by this disclosure. Accordingly, typical examples of liquid crystal material which can be used for these purpose are disclosed in U.S. Pat. No. 4,695,650, entitled "LIQUID CRYSTAL COMPOUNDS AND COMPOSITIONS CONTAINING SAME", issued Sep. 22, 1987. In addition, it should be noted that this disclosure is not limited to scanning devices, and can apply to programmable focus/defocus lenses. More particularly, this concept of beam steering can be utilized in all beam steerers relying on birefringence effect steering, such as PLZT steerers, or the like.

The electrically conductive material layers 26 of liquid crystal polarization switch 14 form a first and second electrical contact and are connected and/or adapted to have applied thereto a common potential, which serves to apply a voltage to polarization switch 14. There is provided a drive circuitry 32, capable of biasing liquid crystal polarization switch 14, thereby perpendicularly rotating the polarization of light impinging thereupon in response to the applied bias. Accordingly, the device can be electronically driven in different states. In doing so the optical properties are changed dependent upon the driven state and therefore the polarization of the light passing therethrough.

More particularly, in the preferred embodiment, the device of the present invention operates in two distinct states. A first state of operation, allows for no change in polarization of the light passing therethrough. Accordingly, when the light is polarized for example along an x-direction, or having an axis of ordinary light along the x-axis, prior to entering the polarization switch, no change in polarization occurs and the light passes therethrough liquid crystal memory cell 12 without undergoing a change in phase. More specifically, light entering liquid crystal memory cell 12 that is polarized along the ordinary axis is not affected, or modulated, by nematic liquid crystal material, that is typically included within liquid crystal memory cell 12 of the preferred embodiment. In a second state of operation, that in which a change in polarization occurs, an external stimulus is applied to liquid crystal polarization switch 14, thereby perpendicularly rotating the polarization of the light passing therethrough. It should be understood that the state of polarization is dependent upon the degree of bias. More specifically, if light entering polarization switch 14 is linearly polarized along the x-axis, or having an axis of ordinary light along the x-axis, once it passes through the biased liquid crystal polarization switch 14, a change occurs whereby the light is then polarized along the y-axis or along the extraordinary axis, resulting in a change in phase, or deflection, of the light passing therethrough.

It should be understood that liquid crystal scanner 10 is illustrated as being composed of optically transparent material, for use when scanning in a transmissive mode. The use of optically transparent material allows for the positioning of liquid crystal phase spatial light modulator 10 within a visual display system, allowing for the passage of light, emitted by the light emitting display device, to pass directly through device 10. An alternative embodiment would allow scanner 10 to act as a reflective scanner (not shown) whereby scanner 10 includes reflective properties allowing for light entering device 10 to undergo a first phase modulation and upon exiting back through device 10 in response to the reflective properties, undergoing a second phase modulation.

Figure 2:
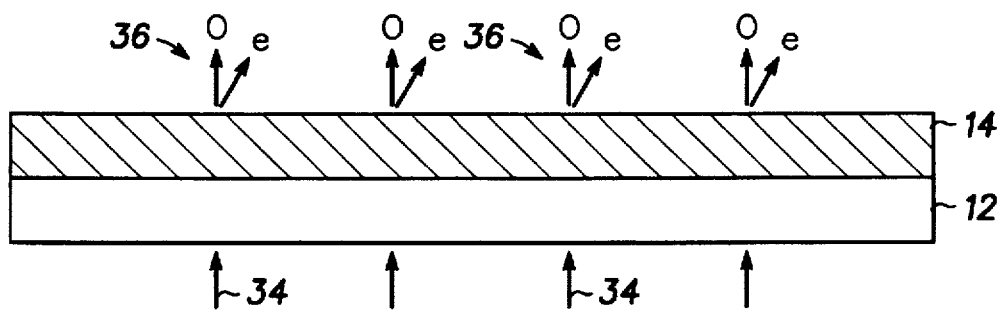
FIG. 2 is a simplified cross-sectional view of the liquid crystal phase spatial light modulator according to the present invention, illustrating the passage and deflection of light passing therethrough.

Referring now to FIG. 2, during operation, light passing through multi-directional liquid crystal phase spatial light modulator, or liquid crystal scanner, 10 undergoes a phase modulation dependent upon the polarization of the light and information recorded in liquid crystal memory cell 12. Illustrated schematically in FIG. 2, more specifically utilizing directional arrows 34, is the passage of light impinging thereupon polarization switch 14 and the passage therethrough liquid crystal memory cell 12, illustrating the resultant multi-directional path 36, more specifically the two directional path, of the exiting light. It should be noted that FIG. 2 illustrates the passage therethrough of light along the ordinary optical axis, referenced as "o", and the passage of light therethrough of light along the extraordinary optical axis, referenced as "e". More particularly, illustrated in FIG. 2 is the resultant phase modulation of the light passing through liquid crystal scanner 10 in response to the change in polarization of the light and recorded alignment of liquid crystal molecules 22 (FIG. 1) of liquid crystal memory cell 12.

Instead of utilizing defined pixels, the scanner of the present invention utilizes specific recorded information at predetermined intervals within liquid crystal memory cell 12. The resulting phase modulation allows for the image source, having minimal pixel numbers and low fill factor, in combination with liquid crystal scanner 10 composed of the at least one liquid crystal cell 12 having recorded information, or molecular alignment, fabricated as a part thereof, and liquid crystal polarization switch 14, to generate an integrated image by modulating the phase of light emitted therethrough in response to the state of operation. The resultant image appears to be composed of a much greater number of pixels, thus enhanced display resolution.

As previously stated, the purpose of this disclosure is to provide for a multi-directional liquid crystal phase spatial light modulator, or scanner. The scanner as disclosed can be utilized in a miniature visual display system, composed of a light emitting display device, the scanner, driver/control circuitry, and a plurality of optical elements. In the preferred embodiment, the use of miniature liquid crystal scanner 10 to bring about the phase modulation of the light emitted by a display device, allows for the display system to remain small in size and permits it to be incorporated into miniature visual displays such as those found in portable electronics equipment, or the like. It should be understood that various sources of light or image generating devices can be utilized such as inorganic or organic light emitting diodes (LEDs), vertical cavity surface emitting lasers (VCSELs), cathode ray tubes (CRTs), field emission displays (FEDs), electroluminescent displays, plasma displays, liquid crystal displays (LCDs), etc., which may be formed in a two-dimensional array each capable of emitting light of a specific phase. It should also be understood that when utilizing these alternative light or image sources, that additional filters and/or optical elements may be required in addition to those described for the preferred embodiment. The general term "light emitting devices" will be utilized throughout this disclosure for the sake of simplicity. It should further be understood that the multi-directional liquid crystal phase spatial light modulator and method of fabrication as disclosed is additionally anticipated to aid in scanning or beam steering in other electro-optical devices, such as target tracking devices, weaponry, printing devices, image scanning devices, and optical communications and telecommunications devices, such as optical computing, optical switching, optical storage or the like.

Thus, disclosed is a new and improved multi-directional liquid crystal phase spatial light modulator including a liquid crystal memory cell and a liquid crystal polarization switch. The liquid crystal memory cell having phase modulation information, more specifically molecular alignment of liquid crystal molecules, recorded therein. The liquid crystal polarization switch capable of changing the polarization of linearly polarized light impinging thereupon in response to an external stimulus. The scanner device of the present invention operates by modulating the phase of light passing therethrough in response to a change in polarization of light and recorded phase information. The liquid crystal scanner of the present invention is meant to be incorporated into a visual display system, more specifically an electro-optical system, additionally composed of a light emitting display device which serves as an image source, driver/control circuitry and optical elements (discussed presently). During operation, the scanner of the present invention serves to shift the pixels of the individual array, groups of pixels of the array, or alternatively serves to shift the entire array, thereby creating enhanced resolution through phase modulation. Further information regarding the shifting of pixels, pixel groups, and arrays can be found in U.S. Patent application entitled "VISUAL DISPLAY SYSTEM FOR DISPLAY RESOLUTION ENHANCEMENT", Ser. No. 08/638,709, filed Apr. 29, 1996, assigned to the same assignee and incorporated herein by this reference.

The visual display system includes various additional optical components while conveniently integrating electrical connections to the components and providing external connections thereto. Light sources, polarizer element(s), diffusers and optics are conveniently integrated into the system which is easily integrated into portable electronic equipment. It is further disclosed that additional optical elements, such as polarizer elements, plates, or layers, refractive elements, diffractive elements, etc. may be easily positioned exterior the visual display system or as a part of scanner device 10.

It should be understood that the resultant integrated image generated by the visual display system, composed of the image source, or light emitting display device, the phase spatial light modulator, driver/control circuits and various optical elements, is too small to properly perceive (fully understand) with the human eye and generally requires a magnification of at least 10× for comfortable and complete viewing. Accordingly, a visual display system of the present invention is typically formed within a housing, defining an optical magnifier, having integrally formed therein an optical magnification system. The optical magnifier is generally defined by a plurality of sides which compose the housing. Several examples of optical magnifiers with optical magnification systems which may have incorporated therein the liquid crystal scanner 10 of the present invention are illustrated in FIGS. 3–7, explained below.

Figure 3:
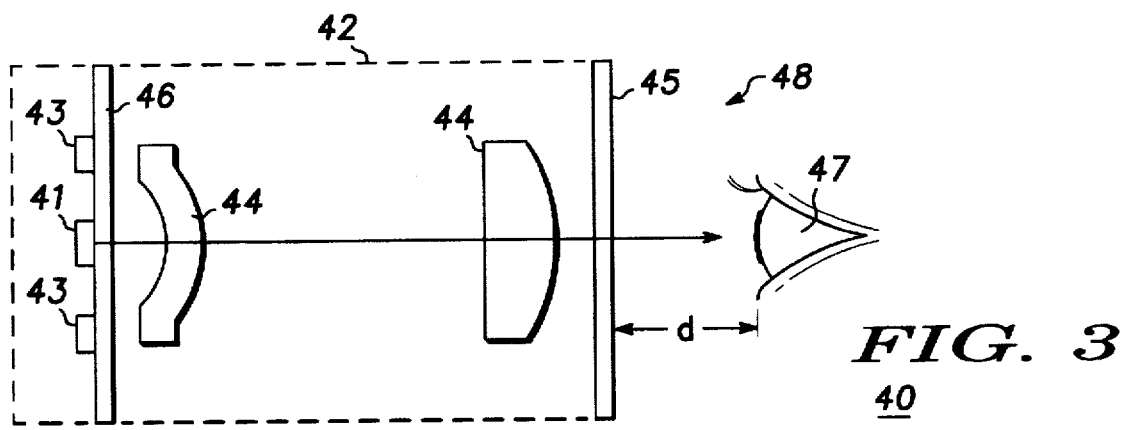
FIG. 3 is a simplified schematic view of a miniature visual image display incorporating the liquid crystal phase spatial light modulator of the present invention.

Referring to FIG. 3, a miniature visual image display 40 is illustrated in a simplified schematic view. Miniature visual image display 40 is defined by housing 42 and includes an image generation apparatus 41 for providing an image, and drivers 43 mounted to a substrate 46. An optical system, represented by optical elements 44, is positioned in spaced relation to image generation apparatus 41 of miniature visual image display 40. A transmissive phase spatial light modulator 45, generally similar to liquid crystal scanner 10, previously described, is positioned to allow the light emitted by image generation apparatus 41 to pass therethrough and produce an image viewable by an eye 47 spaced from an aperture 48.

In operation, the light generated by image generation apparatus 41 passes through optical elements 44 and scanner 45. External voltages are applied to scanner 45, thereby resulting in a desired change in polarization of the light emitted by a plurality light emitting devices of image generation apparatus 41 and thus a scanning of the image. The resultant integrated image viewable by the eye 47 of the observer through aperture 48 appears to have a greater number of pixels and an increased aperture ratio, even though the number of pixels of the image generation apparatus 41 remains the same.

Optical elements 44, represented schematically by a plurality of optical elements mounted in spaced relation from image generation apparatus 41, receive the image from image generation apparatus 41 and magnify it an additional predetermined amount. It will of course be understood that the magnification and/or correction can be provided by any number or type of optical element and may be adjustable for focus and additional magnification, if desired, or may be fixed in a separate housing for simplicity. It should be noted that additional optical elements can be provided exterior the miniature visual image display 40 for further image magnification and/or correction.

Eye relief is the distance that eye 47 can be positioned from viewing aperture 48 and still properly view the image, which distance is denoted by "d" in FIG. 3. Because of the size of lens system, more particularly optical elements 44, eye relief, or the distance d, is sufficient to provide comfortable viewing and in the present embodiment is great enough to allow a viewer to wear normal eyeglasses, if desired.

Figure 6:
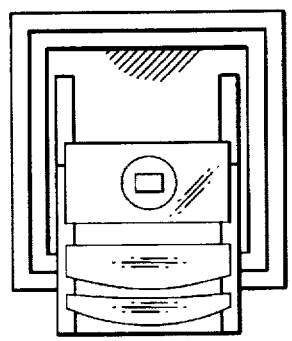
FIGS. 4, 5 and 6 illustrate a front view, side elevational view, and a top plan, respectively, of an image manifestation apparatus utilizing the liquid crystal phase spatial light modulator of the present invention.
Figure 4:
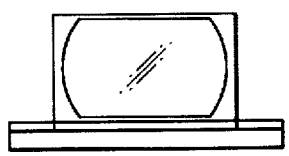
Figure 5:
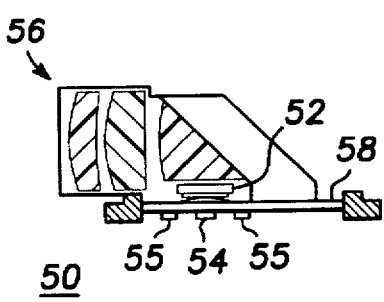

Referring now to FIGS. 4, 5 and 6, another miniature visual image display 50, in accordance with the present invention, is illustrated in a front view, side elevational view, and top plan, respectively. FIGS. 4, 5 and 6 illustrate miniature visual image display 50 approximately the actual size to provide an indication as to the extent of the reduction in size achieved by the present invention. Miniature visual image display 50 includes a transmissive multi-directional liquid crystal phase spatial light modulator 52, hereinafter referred to as liquid crystal scanner 52, (generally similar to liquid crystal phase spatial light modulator 10, described above), an image generation apparatus 54, a plurality of driver/control circuits 55, and a plurality of optical elements, which comprise an optical magnification system 56. Image generation apparatus 54 is mounted in electrical interface with a standard printed circuit board 58. Liquid crystal phase spatial light modulator 52 is mounted to optical magnification system 56, thereby allowing the light emitted by image generation apparatus 54 to pass through liquid crystal scanner 52 and exit the folded optical magnifier formed by optical magnification system 56. It should be understood that scanner 52 can alternatively be mounted elsewhere within display 50.

Figure 7:
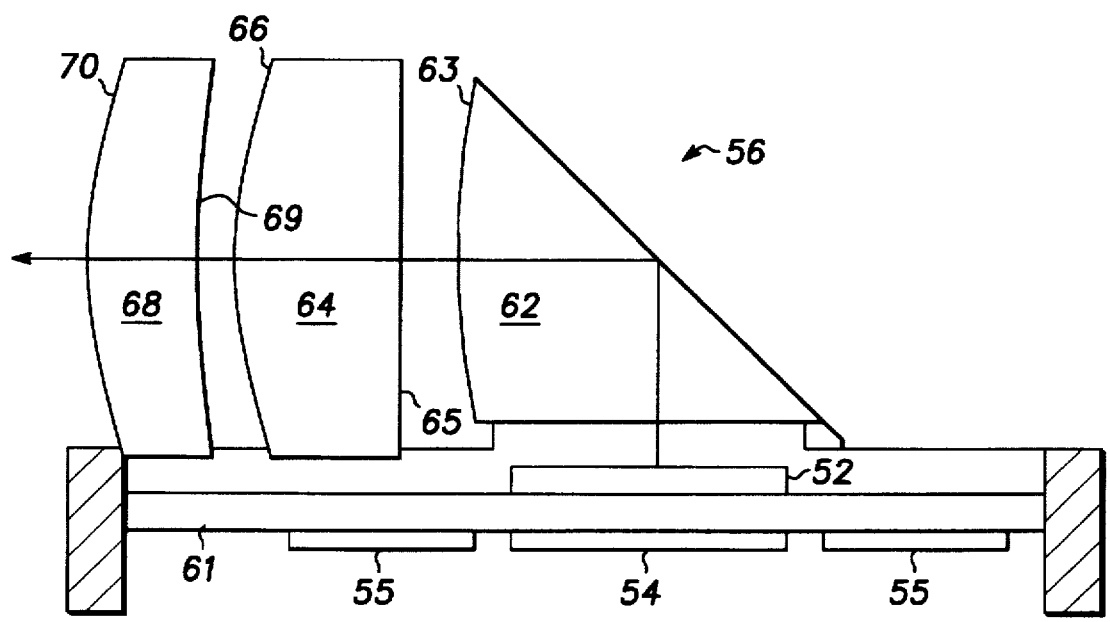
FIG. 7 is a 4× magnified view in side elevation of the apparatus of FIG. 4 utilizing the liquid crystal phase spatial light modulator of the present invention.

FIG. 7, illustrates a 4× magnified view in side elevation of the miniature visual image display of FIG. 4, referenced here as 50, utilizing the transmissive liquid crystal phase spatial light modulator of the present invention. From this view it can be seen that a transmissive liquid crystal scanner 52 (generally similar to transmissive liquid crystal phase spatial light modulator 10 above) is affixed directly to the upper surface of a mounting substrate 61 to which an image generation apparatus 54 is mounted. An optical prism 62 is mounted to reflect the image generated by transmissive liquid crystal scanner 52 through a refractive surface 63. The image is then directed to an optical lens 64 having a refractive inlet surface 65 and a refractive outlet surface 66. From optical lens 64 the image is directed to an optical lens 68 having an inlet refractive surface 69 and an outlet refractive surface 70. Also, in this embodiment at least one diffractive optical element is provided on one of the surfaces, e.g. surface 63 and/or refractive inlet surface 65, to correct for chromatic and other aberrations. The operator looks into outlet refractive surface 70 of optical lens 68 and sees a large, easily discernible visual image which appears to be behind miniature visual image display 50.

It is anticipated by this disclosure that the plurality of optical elements disclosed in FIGS. 4–7, include reflective elements, refractive elements, diffractive elements, polarizer elements, diffusers, or holographic lenses that may be mounted in overlying relationship to the image generation apparatus, specifically positioned on an interior aspect of the optical magnifiers. It is further disclosed that a plurality of optical elements, including reflective elements, refractive elements, diffractive elements or diffusers may be mounted in overlying relationship to the surface of the optical magnifier through which the light, or resultant integrated image, is output, specifically positioned on an exterior aspect of a light output surface, to form an image plane for the light which forms the resultant integrated image.

Multi-directional liquid crystal phase spatial light modulator 10 of the present invention is meant to be incorporated into any number of varying visual image display systems, some of which have been previously described herein. These types of visual image display systems are ultimately intended for use in various types of electronic equipment, namely portable communications equipment, such as cellular and portable telephones, as well as smart-card reader devices, or the like. Liquid crystal phase spatial light modulator 10 is additionally anticipated to aid in scanning or beam steering in other electro-optical devices, such as target tracking devices, weaponry, printing devices, image scanning devices, and within the optical communication and telecommunication fields, such as for use in optical computing, optical switching, optical storage or the like.

Thus, a new and improved liquid crystal phase spatial light modulator composed of a liquid crystal polarization switch, capable of perpendicularly rotating the polarization of light impinging thereupon in response to an external stimulus and a liquid crystal memory cell which serves to spatially modulate the phase of light emitted by a light emitting display device passing therethrough is disclosed which is relatively easy and inexpensive to manufacture. The liquid crystal phase spatial light modulator of the present invention is intended for use in miniature visual display systems. The visual display system components ruggedly mount an image source, various optical components and the liquid crystal phase spatial light modulator scanning device, while conveniently integrating electrical connections to the components and providing external connections thereto. Light sources, polarizers, diffusers and, if desired, additional optics are conveniently integrated into the small visual display system which is easily integrated into a housing, forming an optical magnifier, for use in portable electronic equipment. It is further disclosed that additional optical elements, such as polarizer plates or layers, refractive elements, diffractive elements, etc. may be easily positioned exterior the housing. By using light emitting devices for the light source, with low fill factors, which are scanned by the liquid crystal phase spatial light modulator to generate a resultant integrated image, characterized by high resolution, the size of the system is further reduced and the electrical power required is also minimized.

While we have shown and described specific embodiments of the present invention, further modifications and improvement will occur to those skilled in the art. We desire it to be understood, therefore, that this invention is not limited to the particular forms shown and we intend in the appended claims to cover all modifications that do not depart from the spirit and scope of this invention.

What is claimed is:

1. A liquid crystal phase spatial light modulator comprising:
 a liquid crystal polarization switch capable of rotating the polarization of light passing therethrough in response to an external stimulus; and
 at least one liquid crystal memory cell having phase information recorded therein, the at least one liquid crystal memory cell optically positioned so as to allow light passing through the liquid crystal polarization switch and having undergone a change in polarization, to pass therethrough the at least one liquid crystal memory cell and undergo optical deflection according to the recorded phase information.

2. A liquid crystal phase spatial light modulator as claimed in claim 1 wherein the liquid crystal phase spatial light modulator is incorporated into a miniature visual image display, thereby providing for enhanced display resolution.

3. A liquid crystal phase spatial light modulator as claimed in claim 1 wherein the liquid crystal phase spatial light modulator is utilized in at least one of optical communication devices, telecommunication devices, target tracking devices, weaponry, printing devices, and image scanning devices.

4. A liquid crystal phase spatial light modulator as claimed in claim 1 wherein the at least one of optical communication devices and telecommunication devices includes optical storage devices, optical switching devices and optical computing devices.

5. A liquid crystal phase spatial light modulator as claimed in claim 1 wherein the at least one liquid crystal memory cell and the liquid crystal polarization switch are optically aligned utilizing optically transparent adhesive.

6. A liquid crystal phase spatial light modulator as claimed in claim 1 wherein the at least one liquid crystal memory cell and the liquid crystal polarization switch are fabricated to share at least one common intermediate substrate element.

7. A liquid crystal phase spatial light modulator as claimed in claim 1 wherein the at least one liquid crystal memory cell includes nematic liquid crystal material.

8. A liquid crystal phase spatial light modulator as claimed in claim 1 wherein the liquid crystal polarization switch includes ferroelectric liquid crystal material.

9. A liquid crystal phase spatial light modulator as claimed in claim 1 wherein the liquid crystal polarization switch includes nematic liquid crystal material.

10. A liquid crystal phase spatial light modulator as claimed in claim 1 wherein the liquid crystal polarization switch is capable of perpendicularly rotating the polarization of light impinging thereupon in response to an external stimulus exerted upon the liquid crystal polarization switch.

11. A liquid crystal phase spatial light modulator as claimed in claim 1 wherein the at least one liquid crystal memory cell is fabricated to include a molecular liquid crystal alignment layer providing for one of a mechanically-induced and chemically-induced molecular alignment of a plurality of liquid crystal molecules contained within the at least one liquid crystal memory cell.

12. A liquid crystal phase spatial light modulator comprising:
 a liquid crystal polarization switch capable of perpendicularly rotating the polarization of light impinging thereupon in response to an external stimulus exerted upon the liquid crystal polarization switch; and
 at least one liquid crystal memory cell having phase information recorded in a plurality of nematic liquid crystal molecules contained therein, the at least one liquid crystal memory cell optically positioned so as to allow light passing through the liquid crystal polarization switch and having undergone a change in polarization, to pass therethrough the at least one liquid crystal memory cell and undergo optical deflection according to the recorded phase information.

13. A liquid crystal phase spatial light modulator as claimed in claim 12 wherein the liquid crystal phase spatial light modulator is incorporated into a miniature visual image display, thereby providing for enhanced display resolution.

14. A liquid crystal phase spatial light modulator as claimed in claim 12 wherein the at least one liquid crystal memory cell and the liquid crystal polarization switch are optically aligned utilizing one of an optically transparent adhesive and a common intermediate substrate element.

15. A liquid crystal phase spatial light modulator as claimed in claim 12 wherein the liquid crystal polarization switch includes one of ferroelectric liquid crystal material and nematic liquid crystal material.

16. A liquid crystal phase spatial light modulator as claimed in claim 12 wherein the at least one liquid crystal memory cell is fabricate d to include a molecular liquid crystal alignment layer providing for one of a mechanically-induced and a chemically-induced molecular alignment of a plurality of liquid crystal molecules contained within the at least one liquid crystal memory cell, thereby recording phase information.

17. A liquid crystal phase spatial light modulator as claimed in claim 12 wherein the at least one liquid crystal memory cell is comprised of at least two substrate elements each having positioned thereon a conductive material layer, and having positioned therebetween a continuous layer of liquid crystal material.

18. A liquid crystal phase spatial light modulator as claimed in claim 17 wherein the liquid crystal material is a doped liquid crystal material capable of undergoing a photochemical reaction, thereby optically storing phase information therein.

19. A visual display system comprising:
 an image source, comprised of a plurality of light emitting devices, each of the plurality of light emitting devices capable of emitting light of a specific phase;
 a polarizer element, capable of linearly polarizing the light emitted by the image source;

a phase spatial light modulator, composed of a liquid crystal polarization switch capable of perpendicularly rotating the linearly polarized light impinging thereupon and at least one liquid crystal memory cell having phase information recorded therein; and drive circuitry connected to the plurality of light emitting devices and drive circuitry connected to phase spatial light modulator for delivering a voltage across the phase spatial light modulator, thereby changing the polarization and resultant phase of the linearly polarized light passing therethrough, and generating a resultant integrated image viewable by an observer.

20. A visual display system as claimed in claim 19 wherein the plurality of light emitting devices include one of inorganic light emitting diodes, organic light emitting diodes, field emission displays, cathode ray tubes, vertical cavity surface emitting lasers, liquid crystal displays, and electroluminescent devices.

21. A visual display system as claimed in claim 20 wherein the plurality of light emitting devices of the image source are formed in a two-dimensional array.

22. A visual display system as claimed in claim 20 wherein the at least one liquid crystal memory cell includes nematic liquid crystal material and the liquid crystal polarization switch includes one of nematic liquid crystal material and ferroelectric liquid crystal material.

23. A visual display system as claimed in claim 20 wherein the at least one liquid crystal memory cell and the liquid crystal polarization switch are optically aligned utilizing one of a common intermediate substrate element and an optically transparent adhesive.

* * * * *